United States Patent
Igarashi

(10) Patent No.: US 11,486,727 B2
(45) Date of Patent: Nov. 1, 2022

(54) MAP GENERATION DEVICE, MAP GENERATION METHOD, AND MAP GENERATION COMPUTER PROGRAM

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 16/894,736

(22) Filed: Jun. 5, 2020

(65) Prior Publication Data

US 2020/0386567 A1 Dec. 10, 2020

(30) Foreign Application Priority Data

Jun. 7, 2019 (JP) .............................. JP2019-107123

(51) Int. Cl.
| | | |
|---|---|---|
| *G01C 21/36* | (2006.01) | |
| *G08G 1/01* | (2006.01) | |
| *G06V 10/75* | (2022.01) | |
| *G06V 20/56* | (2022.01) | |

(52) U.S. Cl.
CPC ....... *G01C 21/367* (2013.01); *G01C 21/3658* (2013.01); *G06V 10/751* (2022.01); *G06V 20/588* (2022.01); *G08G 1/0141* (2013.01); *G08G 1/0145* (2013.01)

(58) Field of Classification Search
None
See application file for complete search history.

(56) References Cited

U.S. PATENT DOCUMENTS

| | | | | |
|---|---|---|---|---|
| 9,418,546 | B1* | 8/2016 | Whiting | .............. G06K 9/00771 |
| 2010/0121886 | A1 | 5/2010 | Koshiba et al. | |
| 2017/0344844 | A1 | 11/2017 | Sano et al. | |
| 2019/0095722 | A1* | 3/2019 | Kang | ...................... G06T 7/215 |
| 2020/0370915 | A1* | 11/2020 | Yoshida | ............. G01C 21/3694 |

FOREIGN PATENT DOCUMENTS

| | | |
|---|---|---|
| JP | 2003132353 A | 5/2003 |
| JP | 2007101580 A | 4/2007 |
| JP | 2007156897 A | 6/2007 |

(Continued)

OTHER PUBLICATIONS

NPL Translation of "Miki Hara, Information processing apparatus, communication system and information processing method, 2010" (Year: 2010).*

*Primary Examiner* — James M McPherson
*Assistant Examiner* — Bakari Underwood
(74) *Attorney, Agent, or Firm* — Hunton Andrews Kurth LLP

(57) ABSTRACT

A map generation device extracts, by inputting an image in which a road is represented to a classifier that outputs, for each pixel of the image, a type of a feature object on the road represented by the pixel, a pixel representing a boundary feature object that represents a boundary of a lane among feature objects on the road, calculates a Voronoi boundary by Voronoi-dividing the image with each pixel representing the boundary feature object as a generating point, detects each of the calculated Voronoi boundaries as one lane, and generates map information representing each of the detected lanes.

5 Claims, 8 Drawing Sheets

(56) References Cited

FOREIGN PATENT DOCUMENTS

| JP | 2010277518 A | * | 12/2010 |
| --- | --- | --- | --- |
| JP | 2017041126 A | | 2/2017 |
| JP | 2017215940 A | | 12/2017 |
| JP | 2018106017 A | | 7/2018 |
| JP | 6466038 B1 | | 2/2019 |
| JP | 2019049513 A | | 3/2019 |

* cited by examiner

MAP GENERATION DEVICE, MAP GENERATION METHOD, AND MAP GENERATION COMPUTER PROGRAM

CROSS-REFERENCE TO RELATED APPLICATION

This application claims priority to Japanese Patent Application No. 2019-107123 filed on Jun. 7, 2019, which is incorporated herein by reference in its entirety.

FIELD

The present invention relates to a map generation device, a map generation method, and a map generation computer program that generate a map from an image.

BACKGROUND

A technique for generating a map to be used in a navigation system and the like has been proposed (e.g., see Japanese Unexamined Patent Publication (Kokai) No. 2018-106017). For example, a map information generation device disclosed in Japanese Unexamined Patent Publication (Kokai) No. 2018-106017 combines three-dimensional point group information of latitude/longitude/altitude for each point at a predetermined interval and two-dimensional map information of latitude/longitude for each pixel or several pixels, generates basic map information acquired by adding information about the altitude for each point to the two-dimensional map information, and generates road map information by adding information about a road identified on the basis of a movement path of positional information acquired from a moving object to the basic map information.

SUMMARY

In recent years, a technique of automatic driving control of a vehicle has been developed. In the automatic driving control of a vehicle, it is required to appropriately perform control related to a lane change, merging, passing, or the like. Further, a traffic regulation that varies from lane to lane (e.g., a right lane is a right-turn-only lane, a left lane is a straight-ahead lane or a left-turn-only lane, and the like) may be applied depending on a road. Thus, it is preferable that map information used in the automatic driving control includes information about each lane on an individual road. However, the map information generated by the technique described above does not include information about each lane on an individual road. Further, a vehicle actually travels on a road and a video acquired by a camera mounted on the vehicle is referred, and map information including information about each lane on an individual road can be generated. However, extremely great man-hours and costs are required in order to generate the map information in such a manner.

Therefore, an object of the present invention is to provide a map generation device that generates map information including information about each lane on a road from an image in which the road is represented.

As one aspect of the present invention, a map generation device is provided. A map generation device includes: a processor configured to: extract, by inputting an image in which a road is represented to a classifier that outputs, for each pixel of the image, a type of a feature object on the road represented by the pixel, a pixel representing a boundary feature object that represents a boundary of a lane among feature objects on the road; calculate a Voronoi boundary by Voronoi-dividing the image with each pixel representing the boundary feature object as a generating point; detect each of the calculated Voronoi boundaries as one lane; and generate map information representing each of the detected lanes.

In the map generation device, it is preferable that the processor is further configured to detect a predetermined region including a point where two or more of the Voronoi boundaries intersect each other as an intersection area.

In addition, in the map generation device, it is preferable that the processor is further configured to further extract a pixel representing a regulation feature object representing a traffic regulation among feature objects on the road, and associate, for each of the detected lanes, a traffic regulation represented by the regulation feature object on the lane with the lane.

In this case, it is preferable that the processor associates a traffic regulation related to an intersection with the intersection area closest to the regulation feature object representing the traffic regulation related to the intersection.

As another aspect of the present invention, a map generation device is provided. The map generation device includes: a processor configured to: detect a plurality of vehicles located on a road from an image in which the road is represented; detect each line in which two or more of the plurality of detected vehicles are aligned as an individual lane; and generate map information representing each of the detected lanes.

In the map generation device, it is preferable that the processor detects the road from the image, and detects, as the lane, a line in which two or more of the plurality of detected vehicles are aligned along the road.

As still another aspect of the present invention, a map generation method is provided. The map generation method includes: extracting, by inputting an image in which a road is represented to a classifier that outputs, for each pixel of the image, a type of a feature object on the road represented by the pixel, a pixel representing a boundary feature object that represents a boundary of a lane among feature objects on the road; calculating a Voronoi boundary by Voronoi-dividing the image with each pixel representing the boundary feature object as a generating point; detecting each of the calculated Voronoi boundaries as one lane; and generating map information representing each of the detected lanes.

As still another aspect of the present invention, a non-transitory recording medium in which a map generation computer program is recorded is provided. The map generation computer program cases a computer to execute: extracting, by inputting an image in which a road is represented to a classifier that outputs, for each pixel of the image, a type of a feature object on the road represented by the pixel, a pixel representing a boundary feature object that represents a boundary of a lane among feature objects on the road; calculating a Voronoi boundary by Voronoi-dividing the image with each pixel representing the boundary feature object as a generating point; detecting each of the calculated Voronoi boundaries as one lane; and generating map information representing each of the detected lanes.

As still another aspect of the present invention, a map generation device is provided. The map generation device includes: a processor configured to: extract a road and a stop line from an image in which the road is represented; detect a lane included on the road in response to a ratio of a length of the stop line to a width of the road; and generate map information representing each of the detected lanes.

A map generation device according to the present invention achieves an advantageous effect of being able to generate map information including information about each lane on a road from an image in which the road is represented.

DESCRIPTION OF EMBODIMENTS

A map generation device, and a map generation method and a map generation computer program that are used in the map generation device will be described below with reference to the drawings. The map generation device extracts a pixel representing a boundary feature object representing a boundary line of a lane from an image in which a road is represented, and divides the road into lanes on the basis of the boundary feature object. Alternatively, the map generation device detects an individual vehicle on a road that is captured in an image in which the road is represented, and detects each line in which the detected vehicle is aligned as an individual lane.

Note that, in each embodiment or a modification example described below, an image in which a road is represented, which is a target of map generation processing, is, for example, a bird's-eye image which is acquired by capturing the ground from vertically above and in which an individual road marking represented on a road is recognizable (e.g., an image in which a high resolution satellite photograph or a high resolution aerial photograph is represented). Further, in the following description, an image to be a target of the map generation processing in which a road is represented, may be simply referred to as an image.

First, a map generation device according to a first embodiment will be described. The map generation device according to the first embodiment detects a boundary feature object represented in an image, and divides a road into lanes on the basis of the boundary feature object.

Figure 1:
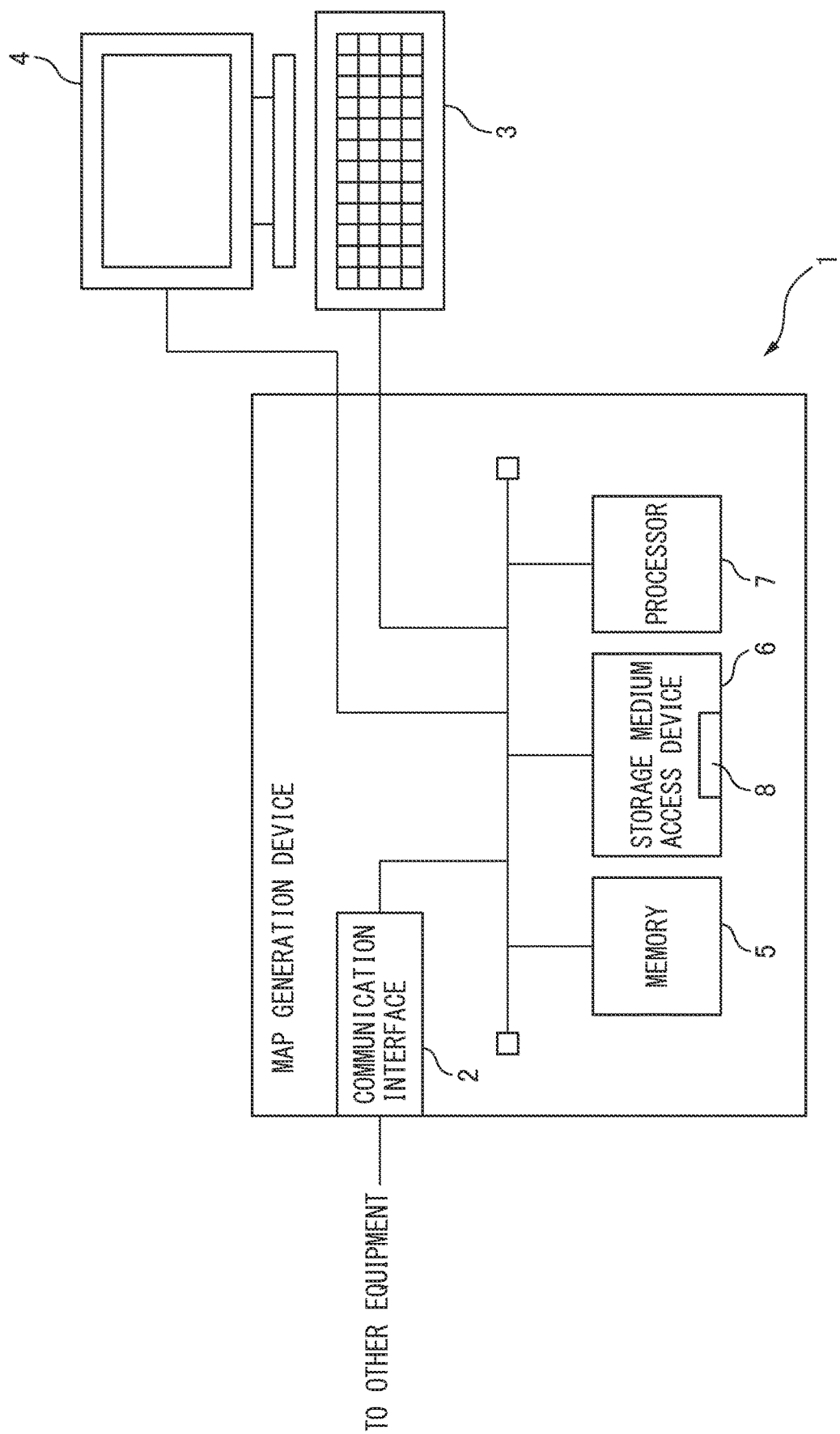
FIG. 1 is a hardware configuration diagram of a map generation device according to a first embodiment.

FIG. 1 is a hardware configuration diagram of the map generation device according to the first embodiment. As illustrated in FIG. 1, a map generation device 1 includes a communication interface 2, an input device 3, a display device 4, a memory 5, a storage medium access device 6, and a processor 7.

The communication interface 2 includes a communication interface for connection to a communication network and a control circuit thereof compliant with a communication standard such as Ethernet (registered trademark). The communication interface 2 receives various types of pieces of information or data from other equipment (not illustrated) connected via the communication network, and passes the received various types of pieces of information or data to the processor 7. The data received by the communication interface 2 may include an image in which a road is represented, which is a target of map generation processing, and information representing a geographical range represented in the image (e.g., a latitude and a longitude of a predetermined position (e.g., an upper left end or the center) of a region represented in the image, a real space size in a horizontal direction and a vertical direction of the region, and a bearing). Further, the communication interface 2 may output a road map that is received from the processor 7 and is one example of map information generated as an execution result of the map generation processing to other equipment via the communication network.

The input device 3 includes, for example, a keyboard and a pointing device such as a mouse. Then, the input device 3 generates an operation signal in response to an operation by a user, such as an operation of selecting an image being a target of the map generation processing, an operation of instructing an execution start of the map generation processing, or an operation of causing the display device 4 to display a generated road map, for example, and outputs the generated operation signal to the processor 7.

The display device 4 includes, for example, a liquid crystal display or an organic EL display. Then, the display device 4 displays display data received from the processor 7, such as data representing a candidate for an image on which the map generation processing is executed, a generated road map, or a part of the generated road map, for example.

Note that the input device 3 and the display device 4 may be a device integrally formed like a touch panel display.

The memory 5 is one example of a storage unit, and is, for example, a readable-writable semiconductor memory and a read-only semiconductor memory. Then, the memory 5 stores, for example, a computer program for the map generation processing executed by the processor 7, various types of pieces of data used in the map generation processing, such as a parameter set that defines a classifier used in the map generation processing, for example, and various types of pieces of data generated during execution of the map generation processing. Furthermore, the memory 5 may store an image being a target of the map generation processing, and information representing a geographical range represented in the image. Furthermore, the memory 5 may store a generated road map.

The storage medium access device 6 is a device that accesses a storage medium 8 such as a magnetic disk, a semiconductor memory card, and an optical storage medium, for example. Note that the storage medium access device 6 together with the storage medium 8 constitute another example of the storage unit. The storage medium access device 6 reads, for example, a computer program for the map generation processing executed on the processor 7 or an image being a target of the map generation processing that is stored in the storage medium 8, and passes the read computer program or the read image to the processor 7. Alternatively, the storage medium access device 6 may receive a generated road map from the processor 7, and write the received road map to the storage medium 8.

The processor 7 is one example of a processing unit, and includes, for example, one or a plurality of CPUs and peripheral circuits thereof. Furthermore, the processor 7 may include an arithmetic circuit for a numerical operation, an arithmetic circuit for graphic processing, and an arithmetic circuit for a logical operation. Then, the processor 7 controls the entirety of the map generation device 1. Further, the processor 7 executes the map generation processing on an image to be target in which a road is represented.

Figure 2:
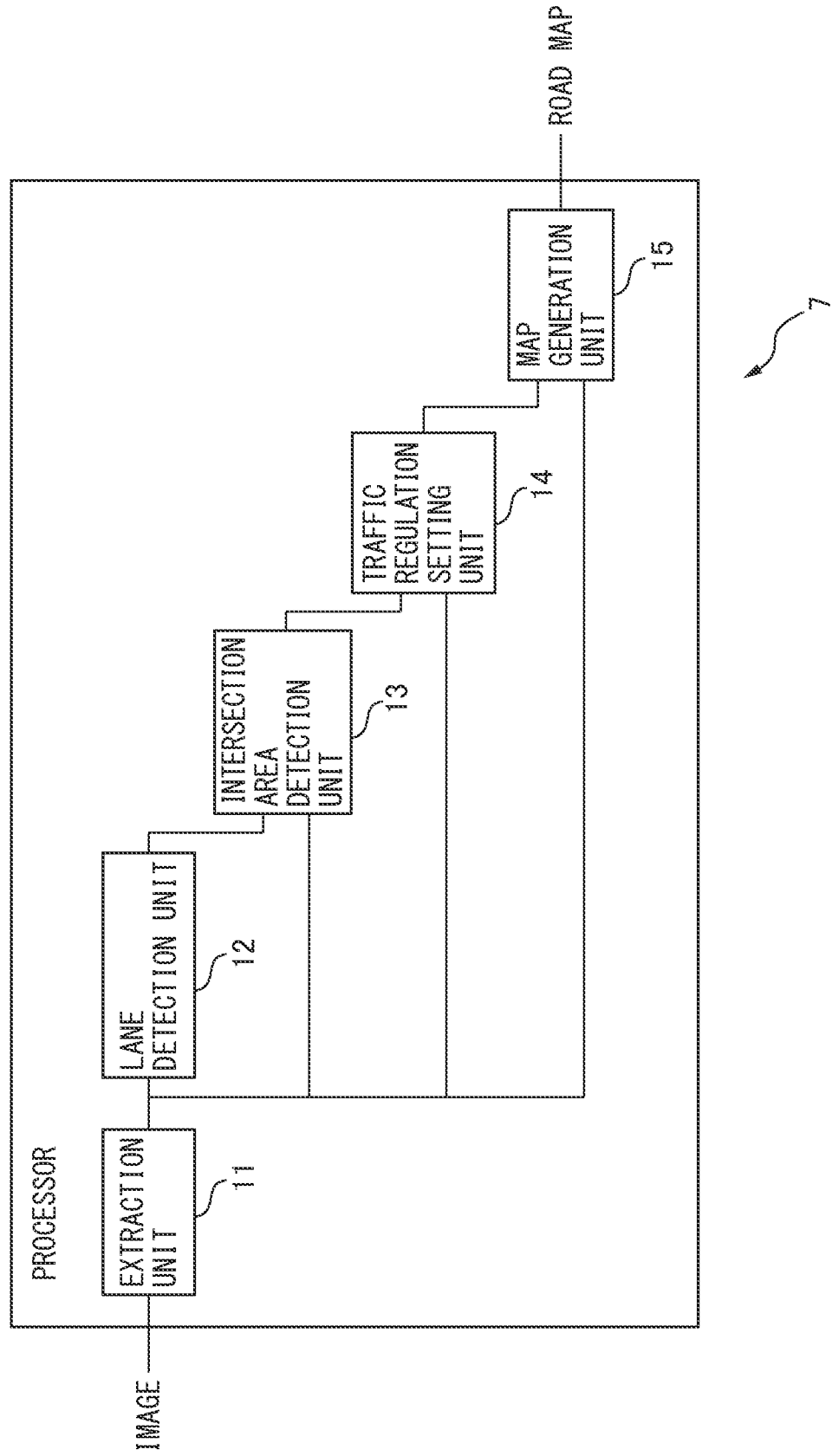
FIG. 2 is a functional block diagram of a processor of the map generation device according to the first embodiment.

FIG. 2 is a functional block diagram of the processor 7 according to the first embodiment. As illustrated in FIG. 2, the processor 7 includes an extraction unit 11, a lane detection unit 12, an intersection area detection unit 13, a traffic regulation setting unit 14, and a map generation unit 15. Each of these units included in the processor 7 is, for example, a function module achieved by a computer program executed on the processor 7. Alternatively, each of these units included in the processor 7 may be a dedicated arithmetic circuit provided in the processor 7.

The extraction unit 11 inputs an image in which a road is represented, which is a target of the map generation processing, to a classifier that outputs, for each pixel of an image, a type of a feature object on the road represented in the pixel. In this way, the extraction unit 11 extracts, from the image, a pixel representing a boundary feature object that represents a boundary of a lane among feature objects on the road, a pixel representing a regulation feature object that represents a traffic regulation, and the like. The boundary feature object includes, for example, a lane division line such as a white line or a yellow line, and a road boundary line such as a curb or a median strip. Further, the regulation feature object includes, for example, a road marking that represents an arrow such as a right turn and a left turn, a stop line, a pedestrian crossing, a speed display, no stopping or a special lane (such as a bus lane and a bicycle lane).

The extraction unit 11 can use, as a classifier, for example, a convolutional neural network (CNN) including an input layer to which an image is input, an output layer that outputs a classification result of a feature object represented by each of a plurality of pixels included in an image, and a plurality of hidden layers connected between the input layer and the output layer. Specifically, the extraction unit 11 can use, as a classifier, a CNN for semantic segmentation, e.g., a CNN such as a fully convolutional network (FCN) (Long, J., Shelhamer and other, "Fully convolutional networks for semantic segmentation", In CVPR, 2015), SegNet, Deep-Lab, RefineNet, or PSPNet. Alternatively, the extraction unit 11 may use, as a classifier, a classifier in accordance with another semantic segmentation technique such as a random forest.

The extraction unit 11 obtains, for each pixel included in an image, classification result data representing a feature object represented in the pixel by inputting the image to the classifier as described above. The classification result data are represented as two-dimensional data that have the same size as that of an image and include each pixel having a value corresponding to a feature object represented by the pixel, for example (e.g., a white line is 1, an arrow is 2, a pedestrian crossing is 3, etc.). Note that a plurality of regulation feature objects of the same type may be represented in an image. Thus, the extraction unit 11 may classify, by executing labeling processing or clustering processing on a set of pixels representing regulation feature objects of the same type, the set of pixels representing the regulation feature objects into individual regulation feature objects. In this case, pixels representing different regulation feature objects may have values different from each other in the classification result data. The extraction unit 11 passes the classification result data to the lane detection unit 12, the intersection area detection unit 13, the traffic regulation setting unit 14, and the map generation unit 15.

The lane detection unit 12 detects, for an individual road represented in an image, an individual lane included on the road on the basis of a set of pixels that is included in the classification result data and represents a boundary feature object. In the present embodiment, the lane detection unit 12 calculates a Voronoi boundary by Voronoi-dividing the image with each of the pixels representing the boundary feature object as a generating point, and detects each of the calculated Voronoi boundaries as one lane. Note that the lane detection unit 12 may calculate a Voronoi boundary in accordance with any algorithm that executes Voronoi division.

A Voronoi boundary is provided in a position at equal distances from two closest generating points. Therefore, with each boundary feature object as a generating point, the Voronoi boundary is calculated in such a way as to extend along an individual lane and to be located in the individual lane. Therefore, the lane detection unit 12 can accurately detect an individual lane by calculating the Voronoi boundary with each of pixels representing the boundary feature object as a generating point.

The lane detection unit 12 passes lane detection result data representing an individual Voronoi boundary (i.e., an individual lane) to the intersection area detection unit 13. Note that the lane detection result data can be, for example, a binary image that has the same size as that of an image being a target of the map generation processing and includes a pixel representing a Voronoi boundary and another pixel having values different from each other.

The intersection area detection unit 13 detects an area including an intersection on an image as an intersection area. In the present embodiment, a Voronoi boundary representing an individual lane is calculated, and thus Voronoi boundaries intersect each other at an intersection. Therefore, a point where the Voronoi boundaries intersect each other, i.e., a Voronoi point appears at an individual intersection. Thus, the intersection area detection unit 13 detects a predetermined region including a Voronoi point as an intersection area. In this way, the intersection area detection unit 13 can accurately detect an individual intersection from an image.

For this purpose, the intersection area detection unit 13 identifies a Voronoi point represented in the lane detection result data. Then, the intersection area detection unit 13 refers to the classification result data for each identified Voronoi point, and sets, as an intersection area, an area including from the Voronoi point to the closest stop line or the closest pedestrian crossing along an individual Voronoi boundary.

Figure 3:
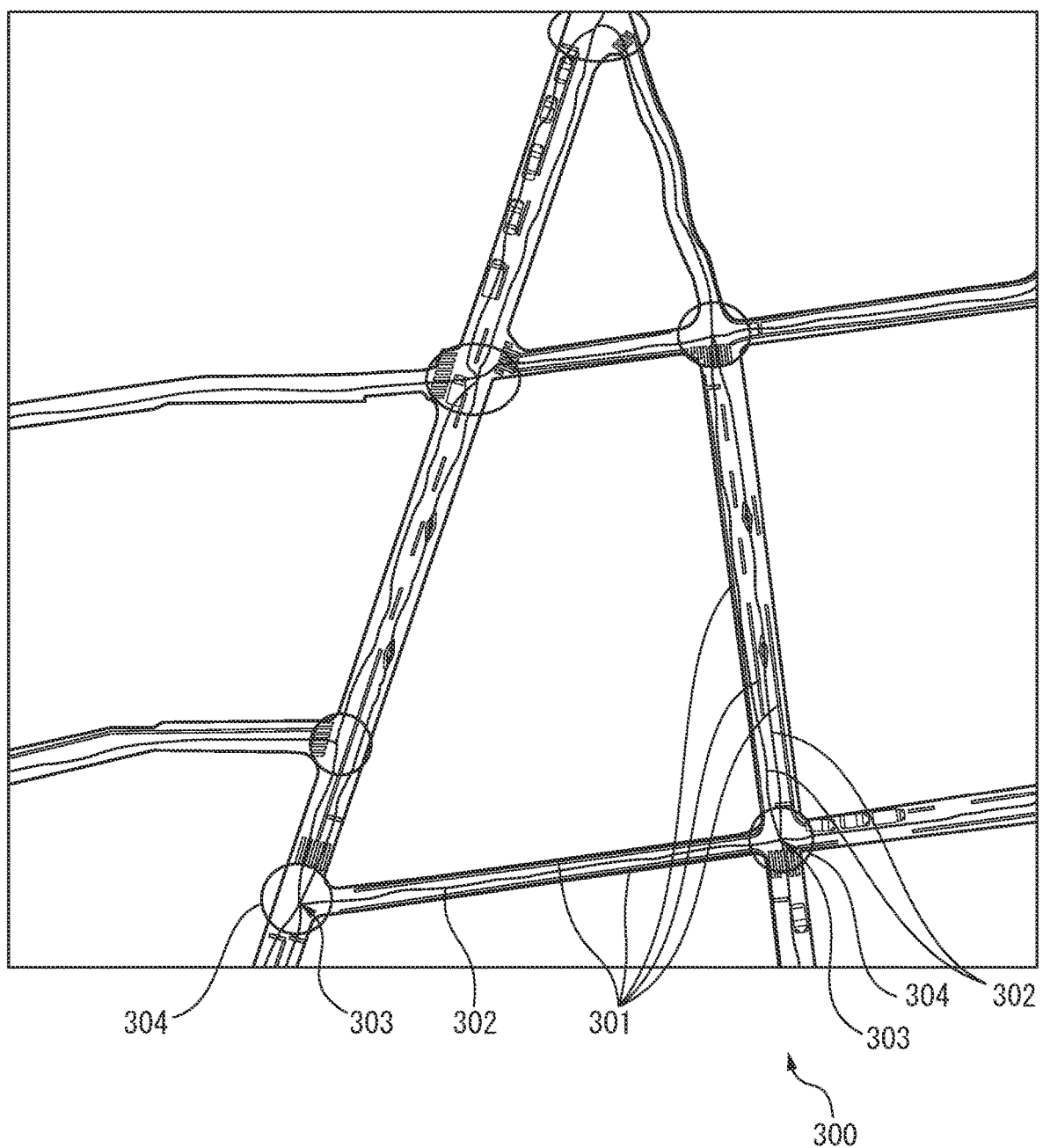
FIG. 3 is a diagram illustrating one example of a detection result of a boundary feature object, a Voronoi boundary, and an intersection area.

FIG. 3 is a diagram illustrating one example of a detection result of a boundary feature object, a Voronoi boundary, and an intersection area. In an image 300 illustrated in FIG. 3, a pixel 301 representing a boundary feature object such as a lane division line and a lane boundary line is extracted. Then, it is clear that each individual Voronoi boundary 302 calculated with the pixel 301 representing the boundary feature object as a generating point represents one lane. Further, it is clear that, for each Voronoi point 303, an intersection area 304 is provided in such a way as to include the Voronoi point.

The intersection area detection unit 13 divides an individual Voronoi boundary, i.e., an individual lane, into any of an intersection area and a single road connecting between intersection areas. In other words, the intersection area detection unit 13 sets, as a single road, a section of an individual Voronoi boundary that is not included in any of intersection areas. Note that, when there are a plurality of Voronoi boundaries connecting between the same two intersection areas, the intersection area detection unit 13 sets the Voronoi boundaries as one single road. Therefore, a single road representing a road on which a plurality of lanes are set, includes Voronoi boundaries having the same number of lanes included on the road. In this way, a lane network representing the individual lane of the road represented in the image is formed.

The intersection area detection unit 13 passes, to the traffic regulation setting unit 14, information representing an individual intersection area, an individual single road, and a lane included on the individual single road that are detected, i.e., information representing a lane network. Note that the information representing the lane network includes, for example, information indicating a position and a range of an individual intersection area, a position of an individual single road, a position of an individual lane included on the single road, and an intersection area connected to the single road in an image being a target of the map generation processing.

The traffic regulation setting unit 14 associates, for each detected lane, a traffic regulation represented by a regulation feature object in the lane with the lane. For example, the traffic regulation setting unit 14 calculates, for each regulation feature object represented in the classification result data, the centroid of a set of pixels representing the regulation feature object. Then, for a regulation feature object representing a traffic regulation set to each individual lane, such as a special lane or right-turn and left-turn arrows, among the regulation feature objects represented in the classification result data, the traffic regulation setting unit 14 associates a traffic regulation represented by the regulation feature object with a lane corresponding to a Voronoi boundary closest to the centroid of the set of pixels representing the regulation feature object.

Further, for a regulation feature object representing a traffic regulation set to a road itself, such as a speed limit, a stop, or no stopping, among the regulation feature objects represented in the classification result data, the traffic regulation setting unit 14 associates a traffic regulation represented by the regulation feature object with a single road on which the centroid of the set of pixels representing the regulation feature object is located.

Furthermore, for a regulation feature object representing a traffic regulation related to an intersection, such as right-turn and left-turn arrows or a stop, the traffic regulation setting unit 14 associates a traffic regulation represented by the regulation feature object with both of an intersection area closest to the centroid of the set of pixels representing the regulation feature object and a single road on which the centroid is located. As described above, the lane network with which the traffic regulation is associated is calculated.

The traffic regulation setting unit 14 passes the information representing the lane network with which the traffic regulation is associated to the map generation unit 15.

The map generation unit 15 generates, for each single road, a road map including information about a detected individual lane. Specifically, the map generation unit 15 associates information representing that a stop line is located in a position of the set of pixels representing the stop line represented in the classification result data with the information representing the lane network with which the traffic regulation is associated. Similarly, the map generation unit 15 associates information representing that a pedestrian crossing is located in a position of the set of pixels representing the pedestrian crossing with the information representing the lane network with which the traffic regulation is associated. Furthermore, the map generation unit 15 associates information representing that a lane division line is located in a position of the pixels representing the lane division line represented in the classification result data with the information representing the lane network with which the traffic regulation is associated. Similarly, the map generation unit 15 associates information representing that a road boundary line is located in a position of the pixels representing the road boundary line represented in the classification result data with the information representing the lane network with which the traffic regulation is associated. In this way, the road map of a geographical range represented in the image being the target of the map generation processing is generated.

Further, the map generation unit 15 may refer to, for each intersection area, information representing the geographical range represented in the image being the target of the map generation processing and a position of the intersection area on the image, calculate a position of an intersection in the intersection area, and associate positional information representing the position of the intersection (e.g., a latitude and a longitude) with the road map. Furthermore, the map generation unit 15 may divide, for each single road, the single road into sections at a predetermined length, refer to, for each of the sections, information representing the geographical range represented in the image being the target of the map generation processing and a position of the section on the image, calculate a position of the section, and associate positional information representing the position of the section with the road map.

Furthermore, the map generation unit 15 may generate a road map of a wider range by coupling road maps generated for each image. At this time, the map generation unit 15 may couple road maps generated from individual images in such a way that the same positions of the same roads overlap each other by referring to, for each image, the information representing the geographical range represented in the image.

The map generation unit 15 stores the generated road map in the memory 5, or writes the generated road map to the storage medium 8 via the storage medium access device 6. Alternatively, the map generation unit 15 may output the generated road map to other equipment via the communication interface 2.

Figure 4:
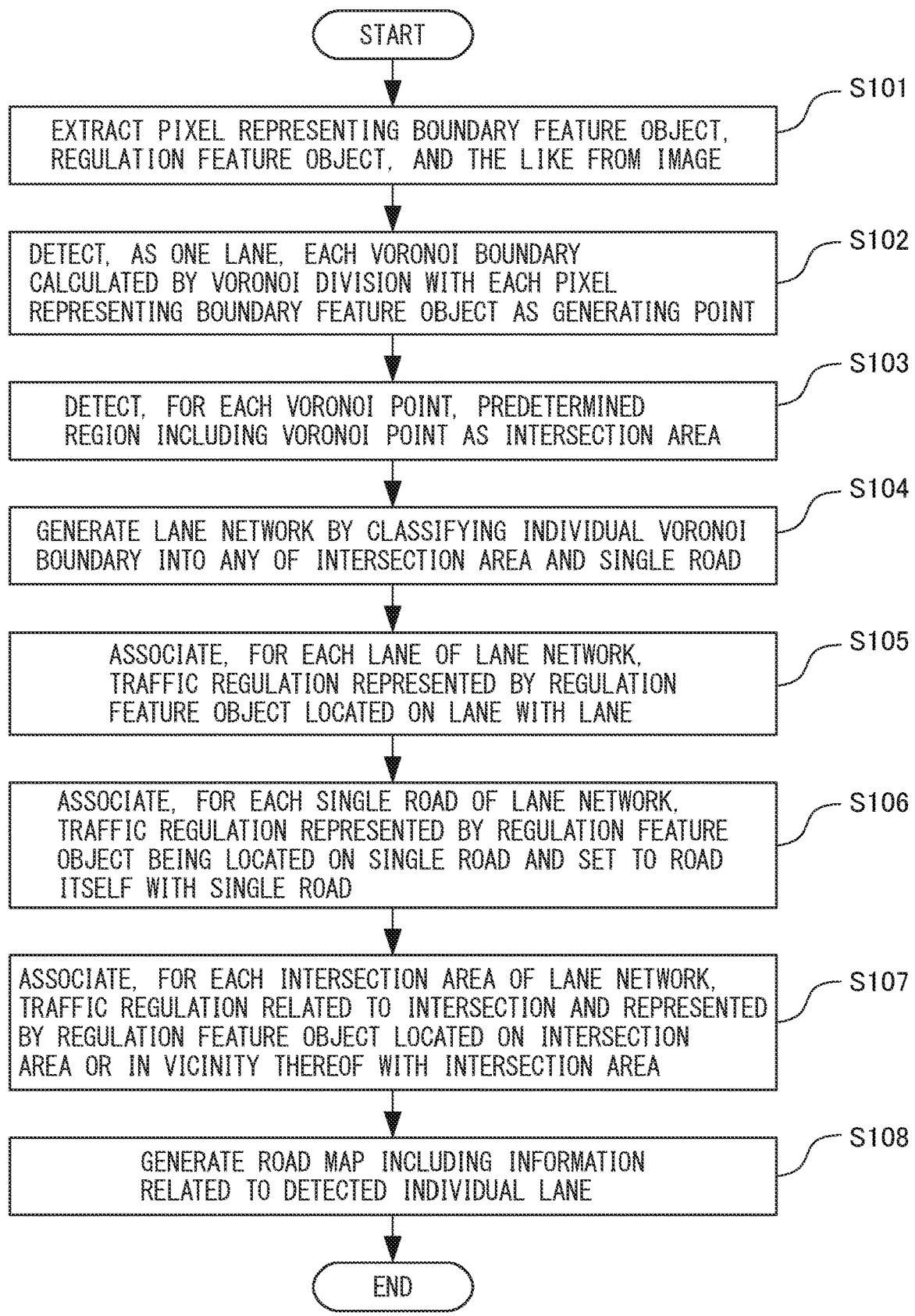
FIG. 4 is an operation flowchart of map generation processing according to the first embodiment.

FIG. 4 is an operation flowchart of the map generation processing according to the first embodiment. The processor 7 may execute the map generation processing according to the following operation flowchart on each image being a target of the map generation processing.

The extraction unit 11 of the processor 7 extracts a pixel representing a boundary feature object, a pixel representing a regulation feature object, and the like by inputting an image to a classifier (step S101).

The lane detection unit 12 of the processor 7 calculates a Voronoi boundary by Voronoi-dividing the image with each pixel representing the boundary feature object as a generating point, and detects each of the calculated Voronoi boundaries as one lane (step S102).

The intersection area detection unit 13 of the processor 7 detects, for each Voronoi point where the Voronoi boundaries intersect each other, a predetermined region including the Voronoi point as an intersection area (step S103). Then, the intersection area detection unit 13 calculates a lane network by dividing the individual Voronoi boundary into any of an individual intersection area and a single road connecting between intersection areas (step S104).

The traffic regulation setting unit 14 of the processor 7 associates, for each lane of the lane network, a traffic regulation represented by a regulation feature object in the lane with the lane (step S105). Further, the traffic regulation setting unit 14 associates, for each single road of the lane network, a traffic regulation represented by a regulation feature object being located on the single road and set to the road itself with the single road (step S106). Furthermore, the traffic regulation setting unit 14 associates, for each intersection area of the lane network, a traffic regulation related to an intersection and represented by a regulation feature object located in the intersection area or in the vicinity thereof with the intersection area (step S107).

The map generation unit 15 of the processor 7 generates a road map including information related to the detected individual lane (step S108). At this time, the map generation unit 15 may associate, with a position in which each of a stop line, a pedestrian crossing, a lane division line, and a road boundary line is detected, information representing that each of them is present. Then, the processor 7 ends the map generation processing in the road map.

As described above, the map generation device extracts a pixel representing a feature object that represents a boundary line of a lane from an image in which a road is represented, and detects, as one lane, each Voronoi boundary calculated by Voronoi division with the extracted pixel as a generating point. Thus, the map generation device can generate map information including information about each lane on the road from the image in which the road is represented. Further, the map generation device can include information related to an intersection in the map information by setting an intersection area on the basis of a Voronoi point where the Voronoi boundaries intersect each other. Furthermore, the map generation device can automatically associate, with each lane, a traffic regulation of the lane, and can also automatically associate a traffic regulation related to an intersection with each lane.

Next, a map generation device according to a second embodiment will be described. The map generation device according to the second embodiment detects a plurality of vehicles captured in an image in which a road is represented, and identifies each line in which two or more of the plurality of detected vehicles are aligned as an individual lane.

Note that the map generation device according to the first embodiment and the map generation device according to the second embodiment are different from each other in processing executed by a processor 7. Thus, details of map generation processing according to the second embodiment being executed by the processor 7 will be described below.

Figure 5:
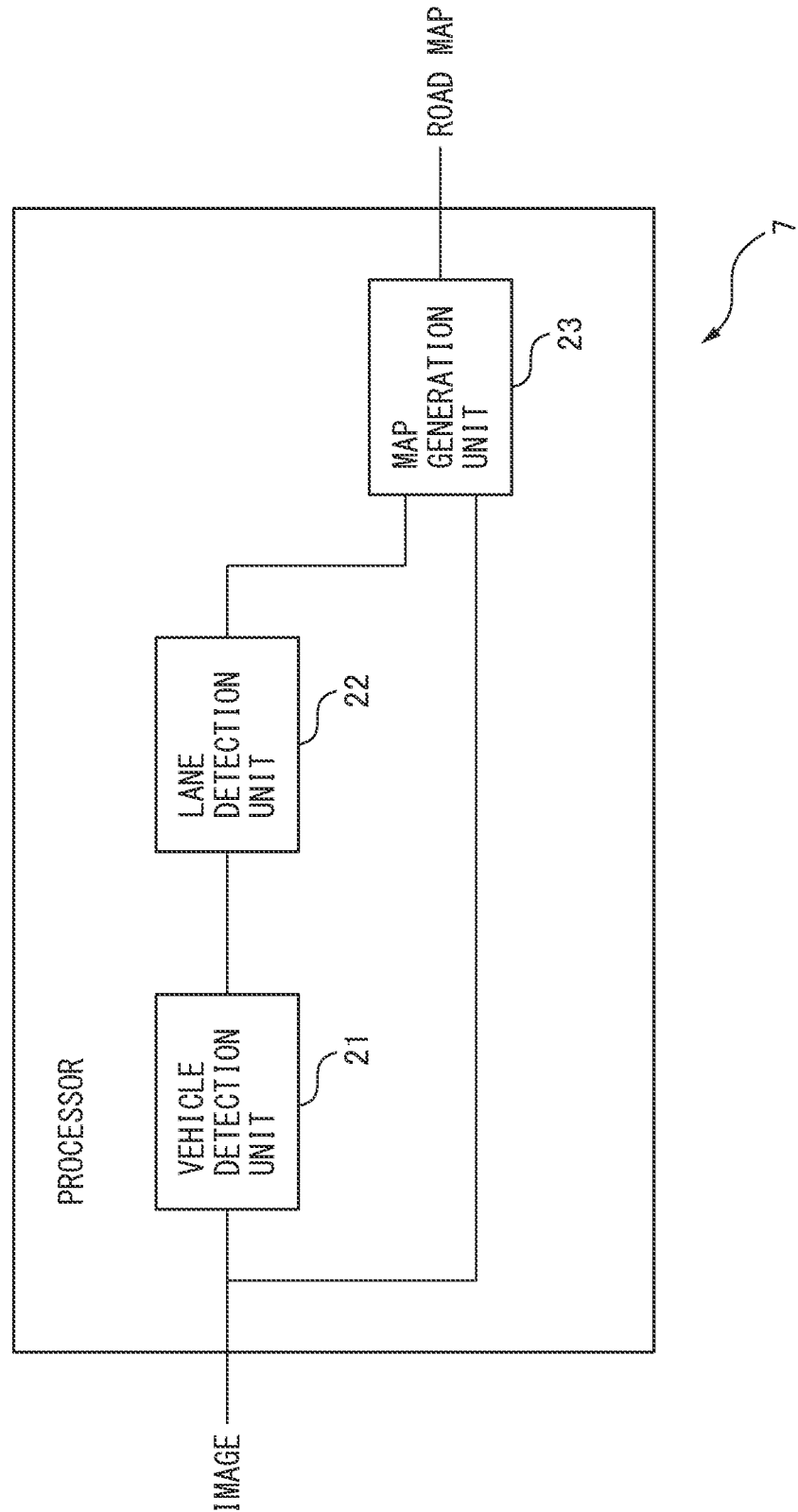
FIG. 5 is a functional block diagram of a processor included in a map generation device according to a second embodiment.

FIG. 5 is a functional block diagram of the processor 7 according to the second embodiment. As illustrated in FIG. 5, the processor 7 includes a vehicle detection unit 21, a lane detection unit 22, and a map generation unit 23. Each of these units included in the processor 7 is, for example, a function module achieved by a computer program executed on the processor 7. Alternatively, each of these units included in the processor 7 may be a dedicated arithmetic circuit provided in the processor 7.

The vehicle detection unit 21 detects a vehicle represented in an image being a target of road generation processing. For example, the vehicle detection unit 21 detects, by inputting an image to a classifier for vehicle detection, a vehicle represented in the input image. As the classifier, the vehicle detection unit 21 can use, for example, a deep neural network (DNN) which has been trained in advance in such a way as to detect, from an input image, a vehicle represented in the image. The vehicle detection unit 21 can use, as such a DNN, a DNN having a CNN type architecture, such as a Single Shot MultiBox Detector (SSD) (see Wei Liu and other, "SSD: Single Shot MultiBox Detector", ECCV2016, 2016) or a Faster R-CNN (see Shaoqing Ren and other, "Faster R-CNN: Towards Real-Time Object Detection with Region Proposal Networks", NIPS, 2015), for example.

Alternatively, the vehicle detection unit 21 may use a classifier other than the DNN as the classifier. For example, the vehicle detection unit 21 may use, as the classifier, a support vector machine (SVM) or an adaBoost classifier which has been trained in advance in such a way as to output, with a feature (e.g., Histograms of Oriented Gradients, HOG) calculated with respect to a window set on an image as an input, a determination result whether or not a vehicle is represented in the window. The vehicle detection unit 21 calculates, while variously changing a position, a size, and an aspect ratio of a window to be set on an image, the feature with respect to the window, and obtains the determination result whether or not the vehicle is represented in the window by inputting the calculated feature to the SVM or the adaBoost classifier.

Alternatively, the vehicle detection unit 21 may use, as a classifier, a classifier for semantic segmentation similarly to the classifier used by the extraction unit 11 according to the first embodiment. In this case, a set of pixels representing a vehicle or a part of the vehicle is extracted by inputting an image to the classifier. Thus, the vehicle detection unit 21 may detect, as one vehicle, individual pixel groups connected to each other by executing labeling processing on the extracted set of pixels.

The vehicle detection unit 21 notifies, for each detected vehicle, the lane detection unit 22 of a predetermined position in a region (e.g., the centroid of the region) in which the vehicle is represented as a position of the vehicle.

The lane detection unit 22 detects a lane on the basis of a plurality of vehicles detected from an image. Herein, an individual vehicle generally travels along a lane. Thus, it is assumed that, for each lane, a plurality of vehicles are aligned along the lane on an image. Thus, the lane detection unit 22 detects a line in which two or more of a plurality of vehicles detected on an image are aligned, and detects the detected individual line as one lane.

For example, the lane detection unit 22 assumes that there are a plurality of combinations of lines in which vehicles are aligned. Then, the lane detection unit 22 identifies a combination in which a total distance from a position of each vehicle to any of lines included in the assumed combinations is minimum among the plurality of combinations, and detects an individual line included in the identified combination as a lane.

In order to determine an assumed combination of lines in which vehicles are aligned, the lane detection unit 22 detects a road from an image, for example. For this purpose, the lane detection unit 22 extracts a set of pixels representing the road by inputting an image to the classifier for semantic segmentation which has been trained in advance in such a way as to extract the pixel representing the road, for example. Note that the lane detection unit 22 can use, as such a classifier, a classifier similar to the classifier used by the extraction unit 11 according to the first embodiment. The lane detection unit 22 sets an individual line obtained by executing thinning processing on the set of pixels representing the road as one road, and detects a position in which the lines intersect each other as an intersection. The lane detection unit 22 may set each of roads connecting two intersections as a single road being a target of lane detection. Alternatively, by applying Voronoi division to the set of pixels representing the road, the lane detection unit 22 may divide the set into a single road and an intersection area, similarly to the first embodiment. In this case, the lane detection unit 22 can calculate a Voronoi boundary for each single road by executing Voronoi division with, as a generating point, a pixel adjacent to a pixel representing other than the road among the set of pixels representing the road. Thus, similarly to the first embodiment, the lane detection unit 22 may identify an intersection area on the basis of a Voronoi point where Voronoi boundaries intersect each other, and set, as an individual single road, a section that is not included in the intersection area among a set of pixels representing the Voronoi boundary and a road around the Voronoi boundary. Note that, when a single road being a target of the lane detection is a curved line, the lane detection unit 22 may divide the single road into sections that can be approximated with a straight line, and detect a lane for each of the sections. Further, for each single road being a target of the lane detection, the lane detection unit 22 calculates a width of the single road by counting the number of extracted pixels aligned in a direction orthogonal to an extending direction of the single road from the extracted set of pixels representing the road. The lane detection unit 22 can determine an assumed combination of lines in which vehicles are aligned by assuming one line for the center of the width of the single road or for each individual section defined by equally dividing the width of the single road by a predetermined number (e.g., two to six).

Figure 6:
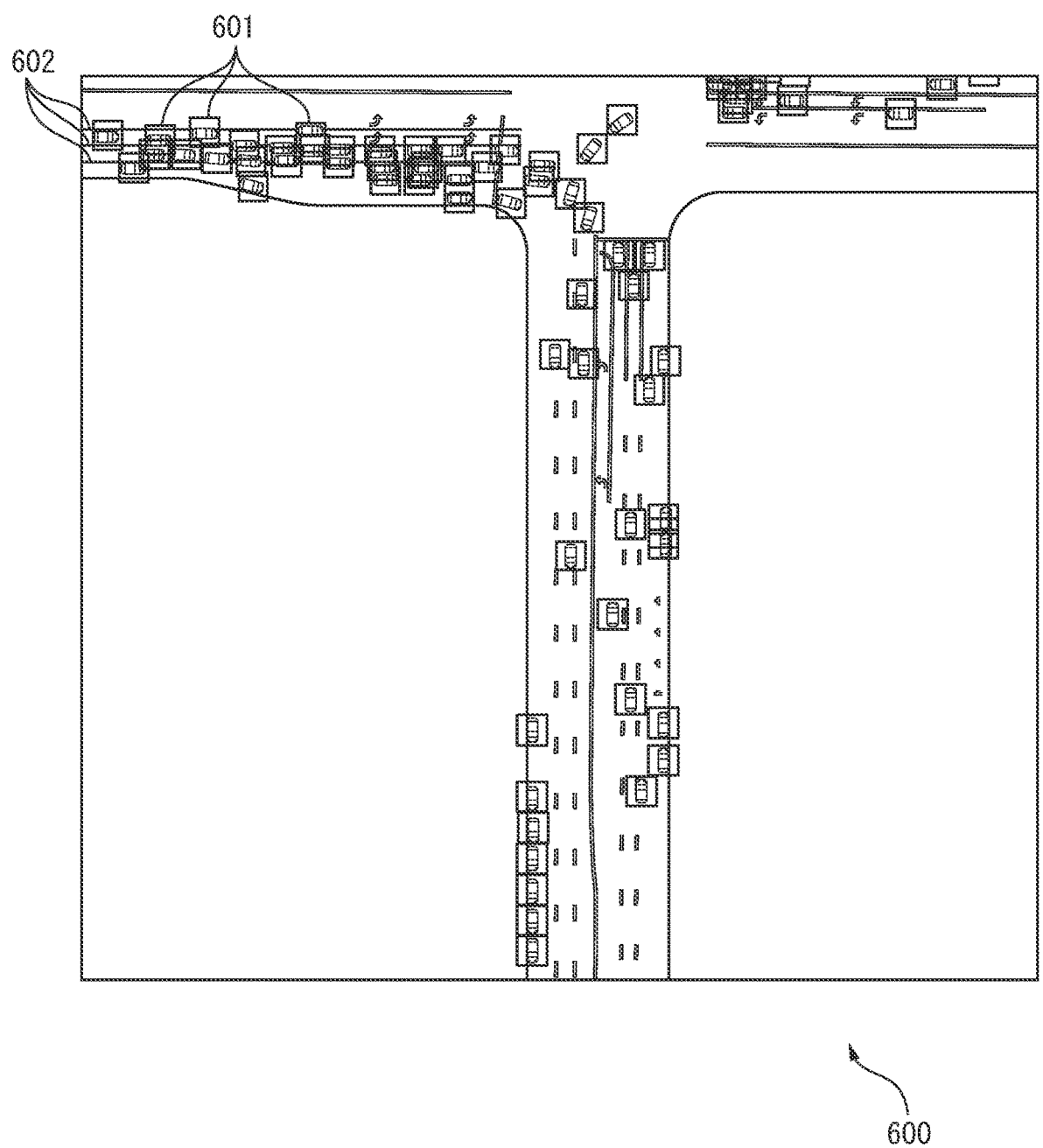
FIG. 6 is a diagram illustrating one example of lane detection on the basis of an individual vehicle detected from an image.

FIG. 6 is a diagram illustrating one example of the lane detection on the basis of an individual vehicle detected from an image. An individual vehicle 601 is detected in an image 600 illustrated in FIG. 6. Then, each line 602 in which the vehicle 601 is aligned along a road is detected as one lane.

The lane detection unit 22 passes lane detection result data representing an individual lane to the map generation unit 23.

The map generation unit 23 refers to the lane detection result data, and generates a road map. At this time, the map generation unit 23 includes, in the road map, information related to an individual lane included in each single road, e.g., information about the number of lanes included in each single road and the like. Furthermore, similarly to the map generation unit 15 according to the first embodiment, the map generation unit 23 may refer to information representing a geographical range represented in an image being a target of the map generation processing and positions of an individual intersection and an individual single road on the image, and associate, for each intersection and each single road, positional information about the intersection or the single road (e.g., a latitude and a longitude) with the road map. Still further, similarly to the map generation unit 15 according to the first embodiment, the map generation unit 23 may generate a road map of a wider range by coupling road maps generated for each image.

The map generation unit 23 stores the generated road map in the memory 5, or writes the generated road map to the storage medium 8 via the storage medium access device 6. Alternatively, the map generation unit 23 may output the generated road map to other equipment via the communication interface 2.

Note that, in the present embodiment, the processor 7 may extract a pixel representing a regulation feature object from an image by executing processing similar to that of the extraction unit 11 and the traffic regulation setting unit 14 according to the first embodiment, and associate, for each regulation feature object, with each lane, each single road, or each intersection, a traffic regulation corresponding to the regulation feature object related to the lane, the single road, or the intersection on the basis of a set of pixels representing the regulation feature object.

Figure 7:
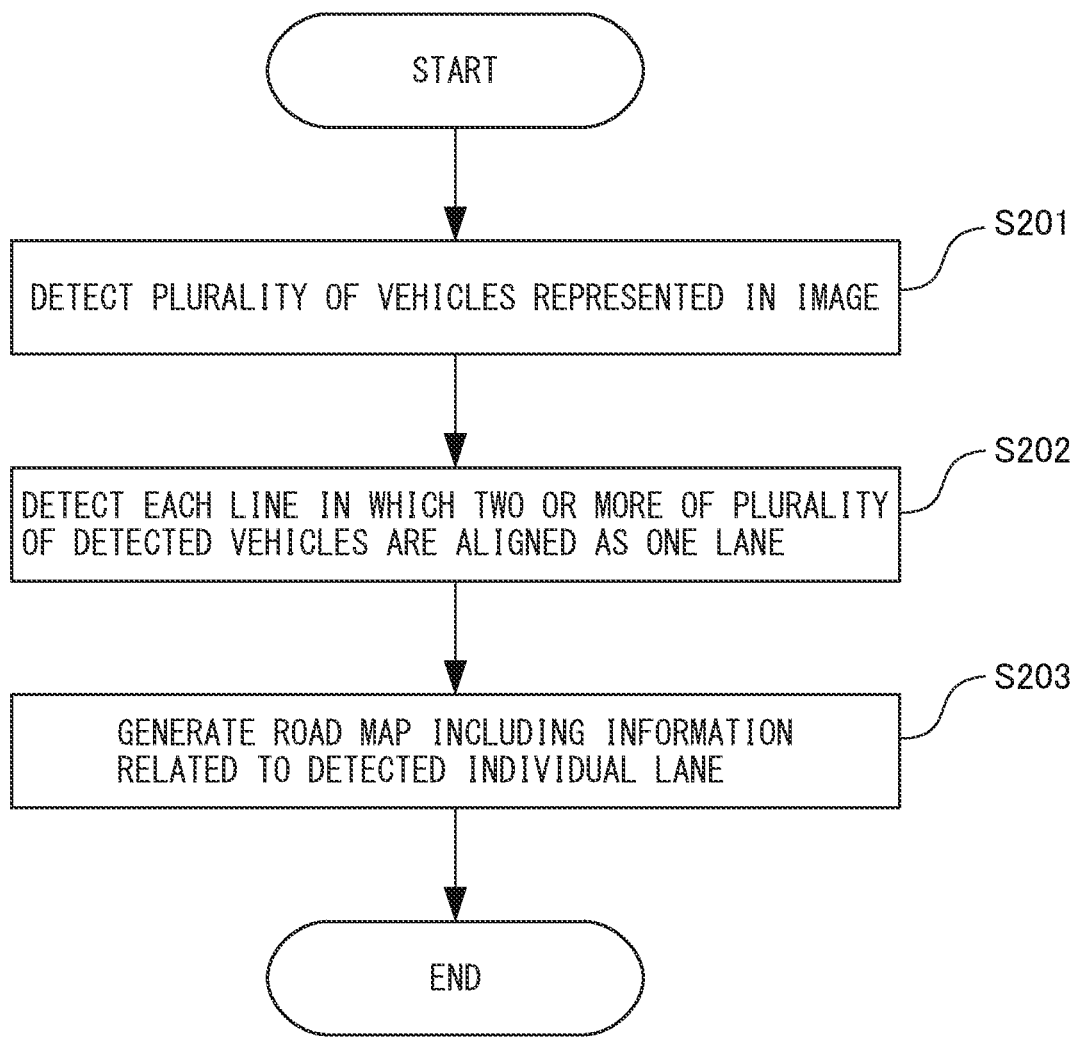
FIG. 7 is an operation flowchart of map generation processing according to the second embodiment.

FIG. 7 is an operation flowchart of the map generation processing according to the second embodiment. The processor 7 may execute the map generation processing according to the following operation flowchart on each image being a target of the map generation processing.

The vehicle detection unit 21 of the processor 7 detects a plurality of vehicles represented in an image by inputting the image to a classifier (step S201).

The lane detection unit 22 of the processor 7 detects a line in which two or more of the plurality of vehicles detected on the image are aligned, and detects each detected individual line as one lane (step S202).

The map generation unit 23 of the processor 7 generates a road map including information related to the detected individual lane (step S203). Then, the processor 7 ends the map generation processing.

As described above, the map generation device detects a vehicle from an image in which a road is represented, and detects each line in which two or more detected vehicles are aligned as one lane. Thus, the map generation device can detect a lane even when a lane division line is not displayed on a road. As a result, the map generation device can generate map information including information about each lane on the road from the image in which the road is represented.

According to a modification example of each of the embodiments described above, the processor 7 may execute, as preprocessing, super-resolution processing on an image being a target of the map generation processing to improve resolution, execute orthographic projection correction processing to correct a tilt of a building represented in the image, or execute processing of removing a shadow. Note that the processor 7 may use known processing as the processing above described.

Further, according to another modification example, the processor 7 of the map generation device may execute processing of the vehicle detection unit 21 and the lane detection unit 22 according to the second embodiment in addition to the processing of each of the units according to the first embodiment. For example, the processor 7 may execute the processing of the vehicle detection unit 21 and the lane detection unit 22 according to the second embodiment on a single road including one lane detected by executing the processing of the extraction unit 11 and the lane detection unit 12 according to the first embodiment, i.e., detected on the basis of a Voronoi boundary, detect a line in which vehicles are aligned, to detect each detected individual line as a lane included on the single road. In this way, the map generation device can detect an individual lane on the basis of a road boundary line including a lane division line for a road on which the lane division line is drawn, and also detect an individual lane for a road on which a lane division line is not drawn.

According to still another modification example of the first embodiment, the lane detection unit 12 may determine the number of lanes by determining whether or not a stop line is provided across the entire single road on the basis of a set of pixels representing the stop line being extracted by the extraction unit 11.

Figure 8A:
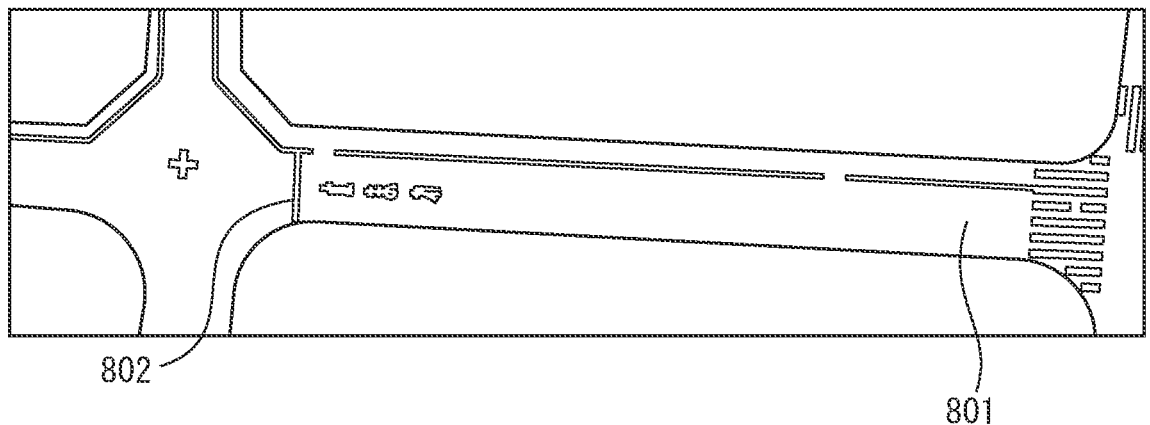
FIG. 8A is a diagram illustrating one example of a stop line drawn on a road.
Figure 8B:
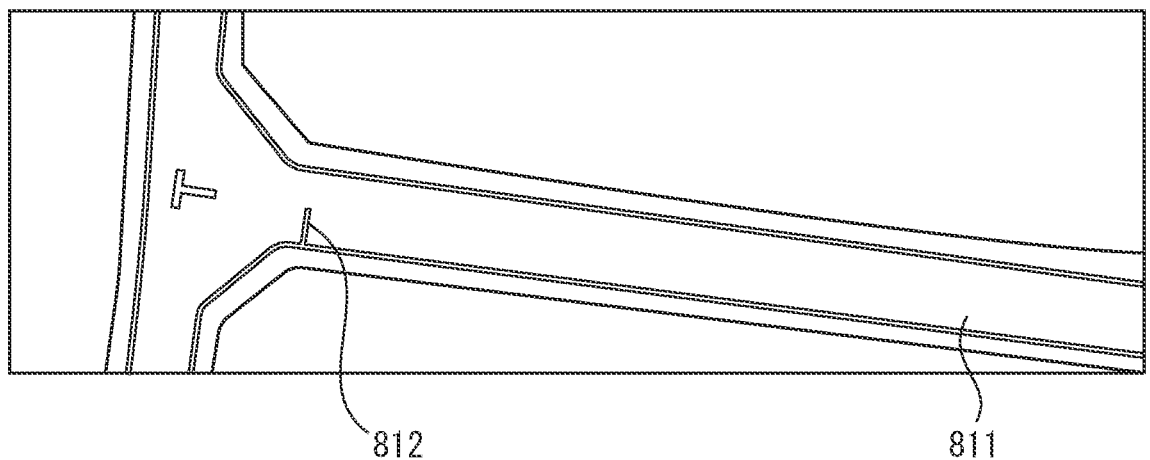
FIG. 8B is a diagram illustrating one example of a stop line drawn on a road.

FIGS. 8A and 8B are diagrams each illustrating one example of a stop line drawn on a road. In the example illustrated in FIG. 8A, a road 801 is a single-lane road, and thus a stop line 802 is drawn across the entire width of the road 801 and connected to road boundary lines at both ends of the road 801. In contrast, in the example illustrated in FIG. 8B, a road 811 is a two-lane road, and thus a stop line 812 is drawn across only a lane targeted by the stop line, i.e., across a substantially half of the width of the road 811. In this way, a ratio of a length of the stop line to a road width varies in response to the number of lanes included on the road.

Thus, according to the modification example, the lane detection unit 12 calculates, for a single road that includes a set of pixels representing the stop line being extracted among single roads identified by the intersection area detection unit 13, the ratio of the length of the stop line to the width of the single road on the basis of the set of pixels. Note that the width of the single road can be, for example, an interval between pixels representing road boundary lines at both ends of the single road being extracted by the extraction unit 11 for the single road. Alternatively, a classifier used by the extraction unit 11 may be trained in advance in such a way as to be able to extract a pixel representing a road itself. In this case, the width of the single road can be the number of continuous pixels representing the road itself in a direction across the single road. Then, the lane detection unit 12 detects one lane on the single road when a ratio of a length of a stop line to the width of the single road is greater than a predetermined threshold value (e.g., 0.6 to 0.8), and, on the other hand, detects two lanes on the single road when the ratio is equal to or less than the predetermined threshold value. Alternatively, the lane detection unit 12 may detect one lane on the single road when a set of pixels representing the stop line is connected to a set of pixels representing a boundary feature object at each of both ends of the single road, and, on the other hand, may detect two lanes on the single road when the set of pixels representing the stop line is connected to a set of pixels representing a boundary feature object at any one of end portions of the single road. Note that, in the modification example, the map generation unit 15 may generate a road map representing a detected individual lane, similarly to the embodiments described above.

Note that, in the modification example, the lane detection unit 12 may execute the above-described processing of determining the number of lanes on the basis of a stop line only on a single road including one lane detected on the basis of a Voronoi boundary.

According to the modification example, the lane detection unit can detect an individual lane for a road on which a lane division line is not drawn.

Furthermore, a computer program that causes a computer to execute a function of each unit included in the processor of the map generation device according to each of the embodiments or the modification examples described above may be provided in form of being stored in a computer-readable recording medium. Note that the computer-readable recording medium can be, for example, a magnetic recording medium, an optical recording medium, or a semiconductor memory.

What is claimed is:
1. A map generation device comprising:
  a processor configured to:
    extract, by inputting an image in which a road is represented to a classifier that outputs, for each pixel of the image, a type of a feature object on the road represented by the pixel, a pixel representing a boundary feature object that represents a boundary of a lane among feature objects on the road;
    calculate a Voronoi boundary by Voronoi-dividing the image with each pixel representing the boundary feature object as a generating point;
    detect lanes by determining each of the calculated Voronoi boundaries as one lane of the lanes; and
    generate map information representing each of the detected lanes, wherein the processor is further configured to:
    detect a predetermined region including a point where two or more of the Voronoi boundaries intersect each other as an intersection area;
    divide each of the detected lanes into the intersection area and a single road;
    divide the single road into sections with a predetermined length;
    associate intersection positional information representing a position of the intersection area with the map information; and
    associate, for each of the sections, section positional information representing a position of the section with the map information.

2. The map generation device according to claim 1, wherein the processor is further configured to
  further extract the pixel representing a regulation feature object representing a traffic regulation among feature objects on the road; and
  associate, for each of the detected lanes, the traffic regulation represented by the regulation feature object on the lane with the lane.

3. The map generation device according to claim 2, wherein the processor associates the traffic regulation related to an intersection with the intersection area closest to the regulation feature object representing the traffic regulation related to the intersection.

4. A map generation method comprising:
  extracting, by inputting an image in which a road is represented to a classifier that outputs, for each pixel of the image, a type of a feature object on the road represented by the pixel, a pixel representing a boundary feature object that represents a boundary of a lane among feature objects on the road; calculating a Voronoi boundary by Voronoi-dividing the image with each pixel representing the boundary feature object as a generating point;
  detecting lanes by determining each of the calculated Voronoi boundaries as one lane of the lanes;
  generating map information representing each of the detected lanes;
  detecting a predetermined region including a point where two or more of the Voronoi boundaries intersect each other as an intersection area;
  dividing each of the detected lanes into the intersection area and a single road; dividing the single road into sections with a predetermined length;
  associating intersection positional information representing a position of the intersection area with the map information; and
  associating, for each of the sections, section positional information representing a position of the section with the map information.

5. A non-transitory recording medium in which a map generation computer program is recorded for causing a computer to execute:
  extracting, by inputting an image in which a road is represented to a classifier that outputs, for each pixel of the image, a type of a feature object on the road represented by the pixel, a pixel representing a boundary feature object that represents a boundary of a lane among feature objects on the road;

calculating a Voronoi boundary by Voronoi-dividing the image with each pixel representing the boundary feature object as a generating point;

detecting lanes by determining each of the calculated Voronoi boundaries as one lane of the lanes;

generating map information representing each of the detected lanes, detecting a predetermined region including a point where two or more of the Voronoi boundaries intersect each other as an intersection area;

dividing each of the detected lanes into the intersection area and a single road; dividing the single road into sections with a predetermined length, associating intersection positional information representing a position of the intersection area with the map information; and associating, for each of the sections, section positional information representing a position of the section with the map information.

* * * * *